June 3, 1952        W. F. HUCH        2,598,696
BALLOON WITH NO LOAD RING
Filed Feb. 13, 1951        2 SHEETS—SHEET 1
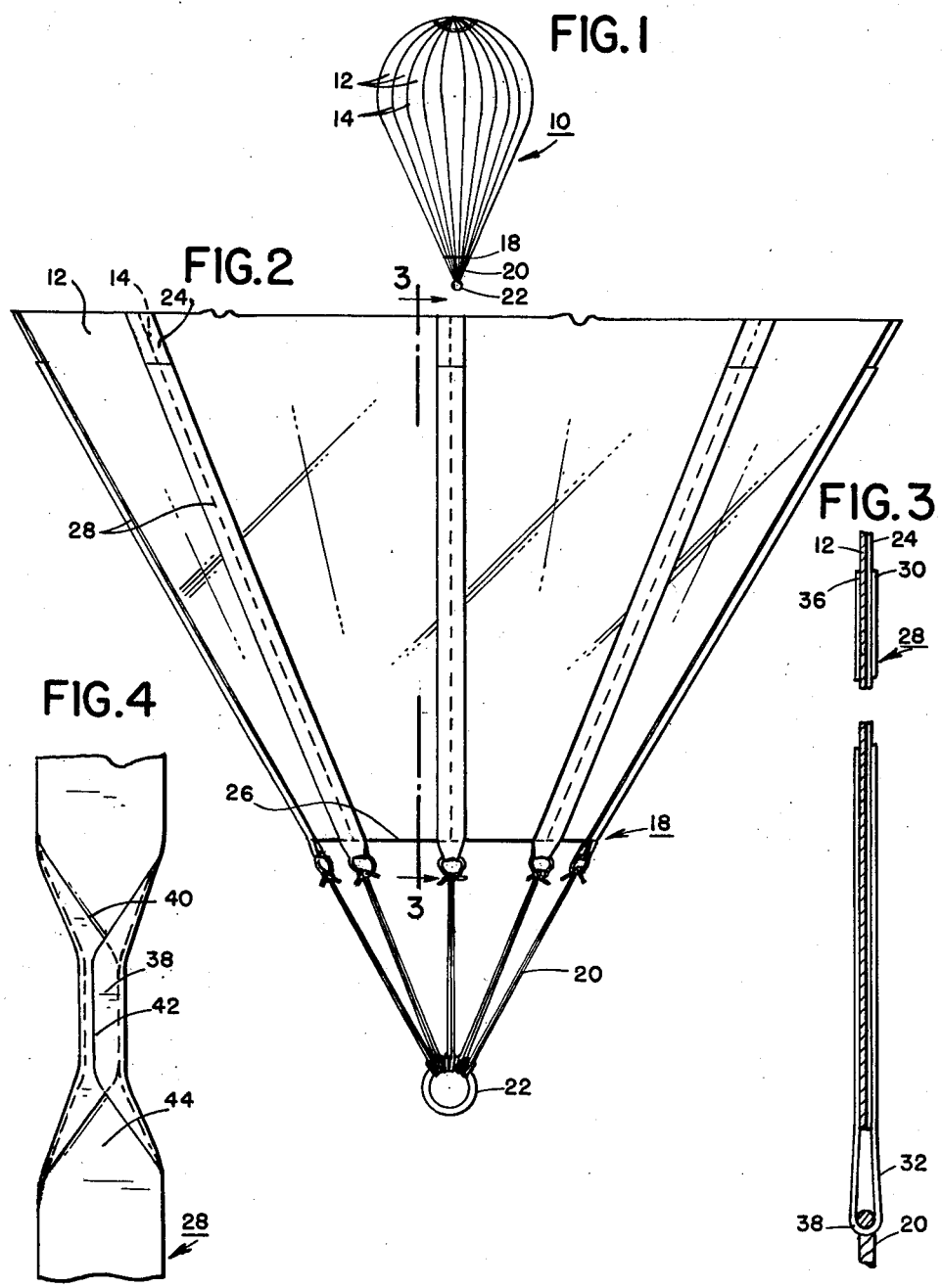
INVENTOR:-
WILLIAM F. HUCH
BY William C. Babcock
ATTORNEY

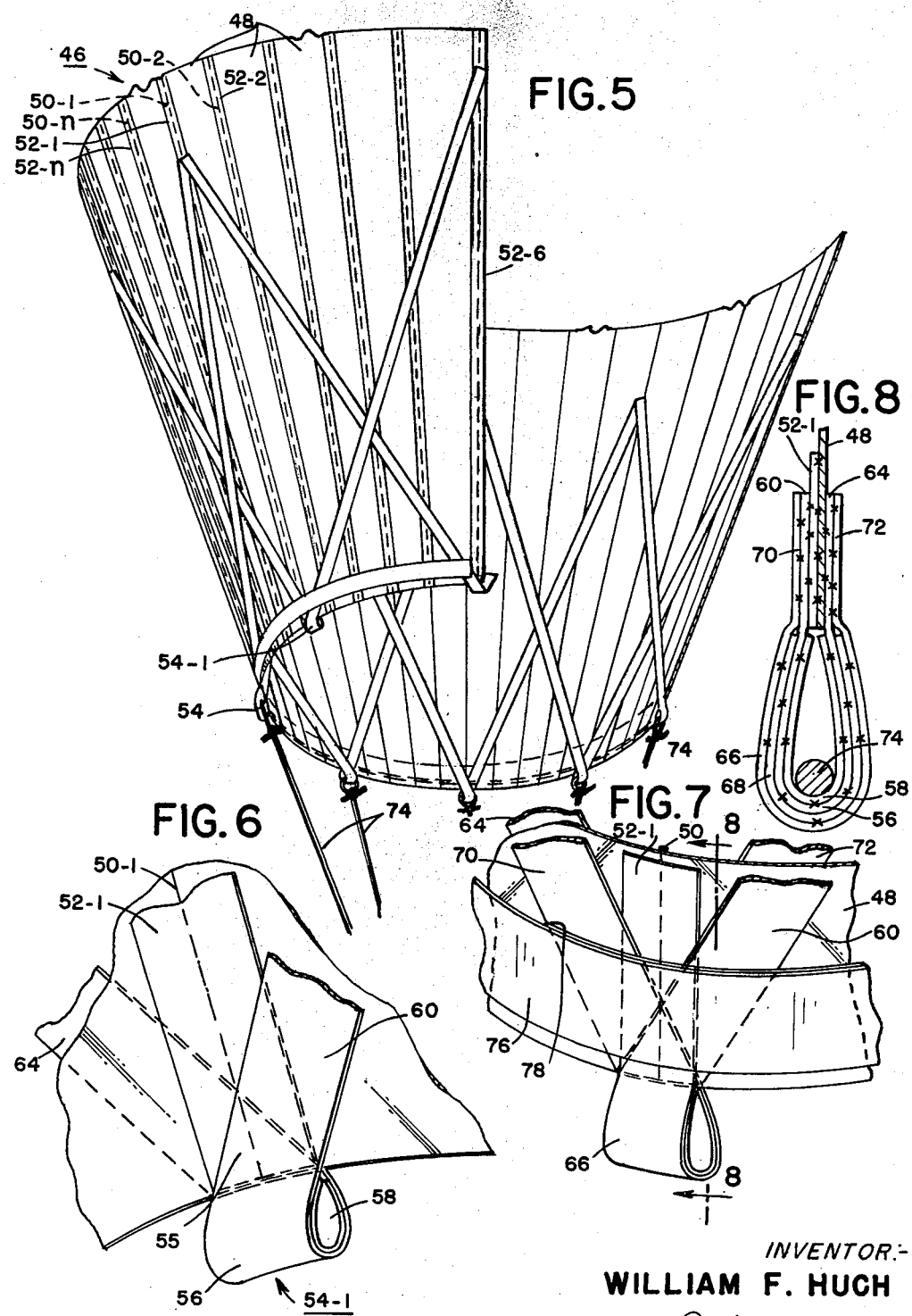

Patented June 3, 1952

2,598,696

UNITED STATES PATENT OFFICE 2,598,696

BALLOON WITH NO LOAD RING

William F. Huch, St. Paul, Minn., assignor to General Mills, Inc., a corporation of Delaware Application February 13, 1951, Serial No. 210,716

8 Claims. (Cl. 244—31)

This application relates to high altitude load bearing balloons, and more particularly to improved features of balloon construction which make it possible to eliminate the usual rigid load bearing ring at the lower portion of such a balloon.

One object of the invention is the provision of an improved means for the attachment of load lines to such a balloon.

A further object is the provision of a high altitude balloon having a substantially conical lower body portion of thin gas proof sheet material, with means for attachment of load lines to portions of the sheet material without the intervention of a rigid ring.

Another object is the provision of a balloon construction in which a conical lower body portion is formed of a plurality of gores joined at their edges in seams corresponding to elements of the cone, with a load attaching member at the exact apex of the cone and with load lines extending from said member to at least a portion of said seams in exact prolongation of the seams.

A still further object is the provision of means for attachment of such load lines to less than all of the seams, with means for distribution of the load stresses from the line to a plurality of adjacent seams.

Other objects and advantages will be apparent from the following specification in which certain preferred embodiments of the invention are described.

In the drawings which form a part of this application, and in which like reference characters indicate like parts, Figure 1 is a perspective view of a balloon of the general type to which this invention has been applied.

Fig. 2 is an enlarged partial view of the lower portion of a balloon body with load attaching means according to the present invention.

Fig. 3 is a sectional view on the line 3—3 of Fig. 2.

Fig. 4 is an enlarged partial view showing details of one of the load attachment tapes of the device of Figs. 2 and 3.

Fig. 5 is an enlarged partial perspective view of the lower portion of a balloon body illustrating another embodiment of the invention.

Fig. 6 is an enlarged partial view of one of the load attachment points showing an intermediate step in the application of the load attachment tapes.

Fig. 7 is a view similar to Fig. 6 with the load attachment tapes completely in position, and Fig. 8 is a sectional view on the line 8—8 of Fig. 7.

As shown in Fig. 1, the balloon in which the present invention is designed to be applied is substantially similar in its main body construction to that described in U. S. Patent 2,526,719, assigned to the same assignee as the present application. This balloon, indicated generally at 10, has a substantially spherical upper portion and an inverted conical lower portion which is tangent to the spherical portion. The balloon is made up of a plurality of vertically extending gores 12 which are joined to each other at their adjacent edges to form seams 14. The gores are preferably of thermoplastic gas proof sheet material which can be seamed together by the application of heat.

A suitable cap member is provided at the top or upper apex of the balloon. The lower portions of the gores and seams terminate in a substantial circle 18 spaced somewhat above what would otherwise be the apex of the conical lower portion of the balloon.

In the prior constructions of the above patent, a rigid balloon ring has been provided at the point 18 for attachment directly to all of the gores 12 and seams 14. Load lines were then attached to the rigid ring at spaced points to provide the sole means for connection between the load and the balloon body. Such a balloon thus requires no load net of the type previously thought necessary to distribute the payload over the upper portion of the balloon.

According to the present invention a load attachment member 22 is provided. This attachment member is located at the exact apex of the cone which would be formed if the lower conical body portion of the balloon were extended to a point. It might be possible in some cases to have the member 22 spaced vertically upwardly toward the balloon along the central vertical axis of the balloon a slight distance above this apex. In no case, however, should member 22 be located below such apex.

As shown in Figs. 1 and 2, a plurality of load lines 20 are connected at one end to the attachment member 22 and at the other end to certain regions at the lower end of the balloon body.

The balloon body construction is shown in somewhat more detail in Fig. 2 in which certain of the vertically extending gores 12 are shown joined to each other at their adjacent edges by seams 14. These seams 14 extend vertically of the conical body portion along a line corresponding to an element of the cone. Over each seam 14, a load bearing tape 24 is provided in the manner described and claimed in the above patent.

To simplify the seaming operation between adjacent gores, it is desirable that the lower portion or edge 26 of each gore should have a definite finite width. Hence the gores and seams terminate at the region 18 spaced some distance above the point at which the apex of the conical body portion would otherwise be located. By location of the load attachment member or ring 22 exactly at this apex, it is possible to provide the load lines 20 between the attachment member and each balloon seam so that the load lines 20 will be in exact prolongation of the seams. Thus forces will be involved which extend longitudinally but not laterally of the seams. Since the gore material 12 is relatively thin and weak compared to the load bearing tapes 24, it is essential that this arrangement be achieved so that all of the forces between the load lines 20 and the balloon body portion will be exerted lengthwise of the load bearing tapes 24 and will not tend to split the gore portions 12.

In order to connect the upper end of each load line 20 to its corresponding load bearing tape 24, attachment tapes 28 have been provided. As shown in Fig. 3, each tape 28 has one end 30 adhesively engaged with the corresponding load bearing tape 24 on the outer surface of the balloon at a point spaced some distance above the lower edges 26 of the gores. The tapes 28 are provided with a pressure sensitive adhesive on their inner surface and the tape may thus be held in adhesive engagement throughout the length of the load tape 24 from the point of application 30 down to the lower edge of the balloon. Just below the lower edge 26 of gores 12, the attachment tape 28 is bent back on itself to provide a loop 32 at substantially the midpoint of the tape. The other end of the tape then extends upwardly along the inner surface of the balloon in adhesive engagement with the corresponding seam portion from the bottom of the balloon body up to a point 36 substantially opposite the starting point 30. At the midpoint 32 of the attachment tape where the loop is formed, a reinforced section 38 is provided.

As shown in Fig. 4, this reinforced section is provided by folding first one edge 40 and then the other edge 42 of the tape 28 over toward each other on the inner adhesively coated side 44 of the tape. Because of the pressure sensitive adhesive at 44, these folded over portions will remain in adhesive engagement with each other and will provide a loop portion 38 of triple thickness in which none of the adhesive is exposed for engagement by the load line 20.

Thus according to this embodiment of the invention, a construction has been provided in which one load line 20 extends in exact prolongation of each load bearing tape 24 of the balloon body and is firmly secured thereto by a U-shaped attachment tape 28 which overlaps the corresponding load bearing tape and seam on both the inner and outer surface of the balloon. Since the load attachment member 22 is at the exact apex of the conical lower body portion, each load line 20 will likewise correspond to an element of the conical body portion and all forces exerted in the carrying of the load will be along the exact lines of such elements. Thus no lateral stresses will be involved and it is accordingly possible to leave the lower edge portions 26 of the gores 12 completely free of reinforcement if desired. This construction accordingly makes it possible to eliminate the rigid ring member which was formerly located at point 18 for direct attachment of all the gores and load bearing tapes on the one hand and the load lines on the other hand. Such a rigid ring has been regarded as necessary in the past to prevent tearing of the lower edge portions 26 of the gores and to distribute satisfactorily the stresses from the load lines 20 to the balloon body. However, the provision of a load line for each load bearing tape, and the arrangement of these load lines in exact prolongation of the load bearing tapes combine to make possible the elimination of the rigid ring with its added weight and thus provide a construction capable of improved high altitude performance.

In some cases, the size of the balloon and the number of gores involved may be so great that it is not considered practical to provide a separate load line for each of the individual load bearing tapes and seams. In such a case, the modification of the invention shown in Figs. 5 through 8 is preferred.

The substantially conical lower balloon body portion 46 shown in Fig. 5 includes a plurality of gores 48 similar to the gores 12 just described. These gores are preferably of thermoplastic sheet material and are heat sealed at their adjacent edges to form vertically extending seams 50 (the specific seams being shown as 50—1, 50—2, ... etc. ... 50—n), corresponding to elements of the cone shaped portion. Load bearing tapes 52 (specifically 52—1, 52—2, ... 52—n) overlie each of the seams 50 throughout their length and are in adhesive engagement with all the seam portions as set forth in the above patent.

Because of the relatively large number of load bearing tapes 52 and seams 50 in the construction at 46, it is desirable in this case to provide load lines for only a portion of the seams. Thus attachment tapes will be utilized to provide loops 54 for the load lines at spaced seams between which one or more intermediate seams and load bearing tapes will be located. For example, in Fig. 5, a loop formed by attachment tapes is shown at 54—1 at the lower end of the load bearing tape 52—1. It will be noted that the next attachment tapes to the right of this point are located at the lower end of the load bearing tape 52—6. Thus in this particular case four intermediate seams and load bearing tapes are located between the two points of attachment.

Just as in the previous embodiment, each load line will be so arranged, and the load attachment member to which the lower end of the load lines are connected will be so located that each load line extends in exact prolongation of the load bearing tape to which it is attached. In order to solve the problem of distributing the stresses from the spaced attachment tapes to the intermediate load bearing tapes, the attachment tapes have been angularly oriented so that they extend diagonally across a plurality of the load bearing tapes. As shown in Figs. 6–8, the first attachment loop 54—1 is provided by a pair of attachment tapes. The first tape 55 is folded back at substantially its midpoint as indicated at 56 to form a loop through which the load line may be passed. This loop portion may be reinforced in the manner shown in Fig. 4 in the previous embodiment or it may be provided with an inner lining strip 58 as shown in Fig. 6. This strip 58 is of similar material and its adhesive surface is placed against the adhesive surface of the taped portion 56 so that the loop through which the load line is to pass will be free of adhesive and will be reinforced by the extra thickness of material. One end of the attachment tape 55 overlies a portion of the corresponding load bearing tape 52—1 and extends diagonally as shown at 60 up across the outer surface of the balloon and across the adjacent load bearing tapes. As shown in Fig. 5, this end 60 of the attachment tape preferably extends all the way to a point 62 at which the tape engages the load bearing tape 52—6 to which the next series of attachment tapes are applied. Thus, in this particular case, the tape portion 60 will assist in equalizing all stresses from the point of attachment at the lower end of load bearing tape 52—1 to the point of attachment of the next load line at the lower end of load bearing tape 52—6.

The remaining end 64 of the attachment tape 56 is adhesively engaged with a portion of the seam corresponding to load bearing tape 52—1 at the inner surface of the balloon and is then extended diagonally up in the opposite direction across the inner surfaces of a plurality of the adjacent seams to assist in the distribution of stresses toward the next attachment tape in the other direction.

To complete the attachment loop 54—1 at the lower end of load bearing tape 52—1 another attachment tape 66 is provided. The midpoint of tape 66 is folded back on itself just as in the manner of portion 56 of tape 54 and may be lined with a reinforcing strip 68 (Fig. 8).

One end 70 of this second attachment tape 66 then extends in adhesive engagement with the outer surface of at least a portion of the load bearing tape 52—1 and then diagonally upward to the left on the outer surface of the balloon substantially overlying the path of the attachment tape end 64 which is on the inner surface of the balloon. The remaining end 72 of tape 66 is then extended diagonally up in the opposite direction on the inner surface of the balloon seam 50—1 and across the adjacent gores and seams, directly beneath the portion 60 of attachment tape 55. The tape portions 70 and 64 accordingly provide a firm connection from the loop to which the load line is attached across the remaining gores and load tapes in one direction to the particular load bearing tape and seam to which the next attachment loop is to be attached.

Similarly, the tapes 60 and 72 furnish a diagonal load bearing connection from the load bearing tape 52—1 and its corresponding seam 50 across the intermediate gores, seams, and load tapes to the tape 52—6 at which the next attachment point is located in the opposite direction.

The use of similar attachment tapes at each point of connection results in the construction shown in Fig. 5 in which diagonal tape portions extend from each point of load line attachment upwardly across the balloon body portion toward a point above the next attachment line. These diagonal attachment tape portions should extend at least to a point of common intersection between tapes from adjacent attachment points, and preferably extend all the way to the next line of attachment as shown in the drawings.

Just as in the previous embodiment, it is essential that the load lines 74 which are connected to the attachment loops 54 should extend at the same angle as the elements of the conical balloon body portion so that each load line 74 is in exact prolongation of the load bearing tape 52 to which it is effectively connected. These load lines 74 are connected to a load attachment member such as the ring 22 of Fig. 2.

While careful attention to the location of the load attachment member and the angle of the load lines 74 may make it unnecessary to provide the usual rigid ring or other reinforcement at the lower end of each gore 48, particularly where the attachment tapes extend diagonally as in the embodiment of Figs. 5 through 8, it is preferable to provide a reinforcing tape 76 (Fig. 7) which extends circumferentially around the lower edge of the balloon body and is lapped over itself as shown at 78. This tape is preferably of the pressure sensitive adhesive coated type and therefore remains in adhesive engagement with all portions of the lower gore edges and seams and tapes. The overlapping of the tape at 78 offers sufficient resistance against circumferential forces to prevent accidental tearing of the relatively thin lower edges of the gore portions 48.

The features of balloon construction described above, and particularly those indicated as preferred features of construction, accomplish the objectives set forth at the beginning of this application and make possible the provision of high altitude load bearing balloons of improved performance characteristics and lower cost.

Since minor variations and changes in the exact details of construction will be apparent to persons skilled in this field, it is intended that this invention shall cover all such changes and modifications as fall within the spirit and scope of the attached claims.

Now, therefore, I claim:

1. A high altitude load bearing balloon comprising a cone-shaped lower balloon body portion having a plurality of vertically extending gores of thermoplastic gas proof sheet material heat sealed to each other at their adjacent edges to form seams corresponding to elements of the cone, said gores and seams terminating above the apex of the cone, a load bearing tape overlying each seam throughout the length of the latter, a load attachment member at the apex of the conical lower body portion, load lines extending from the attachment member to said load bearing tapes in exact prolongation of the latter, and adhesively coated attaching tapes forming a loop for each line at the lower end of said load bearing tapes, each attaching tape having its central portion folded to form the loop, with one end extending upwardly in adhesive engagement with the outside surface of at least a portion of the corresponding load bearing tape and with the other end extending upwardly in adhesive engagement with the inner surface of at least a portion of the corresponding seam and its adjacent gores.

2. A balloon according to claim 1 in which there is one load line extending from the attachment member to each load bearing tape.

3. A high altitude load bearing balloon comprising a cone-shaped lower balloon body portion having a plurality of vertically extending gores of thermoplastic gas proof sheet material heat sealed to each other at their adjacent edges to form seams corresponding to elements of the cone, said gores and seams terminating above the apex of the cone, a load bearing tape overlying each seam throughout the length of the latter, a load attachment member at the apex of the conical lower body portion, load lines extending from the attachment member to less than all of said load bearing tapes in exact prolongation of the latter, and adhesively coated attaching tapes forming a loop for each line at the lower end of said load bearing tapes, each attaching tape having its central portion folded to form the loop, with one end extending upwardly in adhesive engagement with the outside surface of at least a portion of the corresponding load bearing tape and with the other end extending upwardly in adhesive engagement with the inner surface of at least a portion of the corresponding seam and its adjacent gores.

4. A balloon according to claim 3 in which said attachment tapes extend diagonally upward at each side of the load bearing tape to which said loop is attached and overlap at least one adjacent load bearing tape and seam.

5. A balloon according to claim 4 in which the attachment tapes for each loop extend diagonally upward at least to a point of intersection with an attachment tape of the next adjacent loop.

6. A high altitude load bearing balloon comprising an inverted cone-shaped lower balloon body portion having a plurality of vertically extending gores of thermoplastic gas proof sheet material heat sealed to each other at their adjacent edges to form seams corresponding to elements of the cone, said gores and seams terminating a given distance above the apex of the cone, a load attachment member at said apex, load lines extending from the attachment member to less than all of said seams in exact prolongation of the latter, and adhesively coated attachment tapes forming a loop for each line at the lower end of the corresponding seam, each loop comprising at least one tape having its central portion doubled to provide the loop and having its ends extending diagonally upwardly in opposite directions in adhesive engagement with said seam and with at least the adjacent gore and seam at each side thereof.

7. A balloon according to claim 6 in which each loop includes two attachment tapes, the first tape having a first end extending diagonally upwardly in one direction on the outer surface of the balloon and a second end extending diagonally upwardly in the opposite direction on the inner surface of the balloon, and the second tape having a first end extending diagonally upwardly on the outer surface of the balloon above the second end of the first tape, and the second end of the second tape extending diagonally upwardly on the inner surface of the balloon beneath the first end of the first tape.

8. A balloon according to claim 7 in which each tape end extends diagonally upwardly to the seam at which the next load line is attached.

WILLIAM F. HUCH.

REFERENCES CITED

The following references are of record in the file of this patent:

UNITED STATES PATENTS

| Number | Name | Date |
| --- | --- | --- |
| 2,526,719 | Winzen | Oct. 24, 1950 |

FOREIGN PATENTS

| Number | Country | Date |
| --- | --- | --- |
| 4,104 | Great Britain | 1878 |